United States Patent [19]

Keglewitsch

[11] 4,099,819
[45] Jul. 11, 1978

[54] MODULAR TERMINATION SYSTEM FOR TELECOMMUNICATION DEVICES

[75] Inventor: Josef Keglewitsch, Addison, Ill.

[73] Assignee: Bunker Ramo Corporation, Oak Brook, Ill.

[21] Appl. No.: 722,675

[22] Filed: Sep. 13, 1976

[51] Int. Cl.² ............... H01R 11/20; H01R 13/54
[52] U.S. Cl. ............... 339/75 M; 339/91 R; 339/99 R
[58] Field of Search ............ 179/98; 339/75 R, 75 M, 339/91 R, 95 R, 96, 97 R, 99 R, 105, 107

[56] References Cited

U.S. PATENT DOCUMENTS

| | | | |
|---|---|---|---|
| 2,899,669 | 8/1959 | Johanson | 339/91 R X |
| 3,798,587 | 3/1974 | Ellis et al. | 339/91 R X |
| 3,866,996 | 2/1975 | Elkins | 339/99 R |
| 3,894,783 | 7/1975 | Messner | 339/91 R |

Primary Examiner—Roy Lake
Assistant Examiner—E. F. Desmond
Attorney, Agent, or Firm—William Lohff; F. M. Arbuckle

[57] ABSTRACT

A module for a modular termination interchange system has a one-piece panel supporting an array of contacts. Patch cord connectors engage selected ones of these contacts from the front side of the panel as a means of selectively programming line selection and/or function. A plurality of projections extend from the rear of the panel to support electrical connector units each having a plurality of contacts which are electrically connected to the contacts supported by the panel, the contacts of a connector unit connected to respective contacts of at least one row of panel-mounted contacts so as to associate that row or rows with a particular electrical connector unit. Complementary mating connector units are interengageable with the connector units supported by the panel projections and extend the electrical connections, via respective cables, to telephones at the distal ends of the cables. The interchangeability of the electrical connectors permits complete freedom in associating telephones with telephone lines and signaling and switching functions without relocating a telephone instrument.

31 Claims, 14 Drawing Figures

MODULAR TERMINATION SYSTEM FOR TELECOMMUNICATION DEVICES

BACKGROUND OF THE INVENTION

1. Field of the Invention

This invention relates to a termination system for telecommunication devices, and is particularly concerned with modular interchange termination apparatus for multi-function telecommunication devices, such as key telephones.

2. Description of the Prior Art

Telephone termination systems, particularly those associated with key telephones in a business office environment, have heretofore required a great deal of time and expense in connection with installation, maintenance, and line and function flexibility in providing changes in an alteration of service.

Francis J. Mullin and Raymond B. Ramsey, in their U.S. Pat. No. 3,573,373 disclose a cable terminating system for key telephone closets in which a number of connector blocks, such as the Western Electric 66A or 66B terminal blocks, are mounted within expandable groups on boards which are equipped with prepositioned mounting brackets for the blocks. The brackets stand off from the boards to provide cable runs and jumper wires are extended vertically or horizontally between the brackets with the aid of wire guides. The utilization of such permanent or semi-permanent connections, including lugs and insulation piercing terminals, such as provided by the aforementioned Western Electric terminal blocks, gives rise to problems concerning wiring flexibility. For example, if four incoming lines are available and a key telephone has access to two of the four lines, and access is to be altered to three available lines, additional connections must be individually provided and physically performed at the terminal blocks. From an installation standpoint, this problem is compounded if one of the original two lines is not to service the key telephone, which means that the function conductors associated with the line (ringing, lamps, etc) must be disconnected. Personnel changes in a customer's facility, and changes in customers, causes maintenance of such a connection system to become a problem. Also, when a customer acquires additional floor space, or shifts personnel to different areas of a given floor space, the function conductors associated with each key telephone must be disconnected and/or connected to different terminals of the terminal blocks. In addition to interfering with the customer's business activities, reconfiguration of the connection system requires additional installation time.

Marion L. Humphrey and Ernst A. Tugaudis, in their U.S. Pat. No. 3,869,582 disclose an intrabuilding telephone system in which connections are extended between incoming lines and individual telephones with junction arrays and distribution panels constructed, for example, with standard Amphenol CCB Panels which are described, for example, in "The Denver Plan—CCB A Method of Reducing Central Office Bulge", published by Amphenol Industrial Division of Bunker Ramo Corporation, the assignee of the present invention. In the Humphrey and Tugaudis system, interpanel connections are provided with flexible interconnection possibilities in utilizing well-known patch cord jumpers. At the distant ends of the individual telephone lines, conventional telephone jacks are provided to plug telephones into and out of service.

In his application for U.S. patent, Ser. No. 736,030, filed Oct. 27, 1976, a continuation of Ser. No. 480,852, filed June 19, 1974 (now abandoned) Arie Verhagan discloses an interchange termination system which is constructed on a modular basis and which overcomes the disadvantages associated with systems of the type set forth above. In the Verhagan system, advantages are provided in addition to flexibility in changes of service and relocation of telephones, not heretofore found in the art. As explained by Verhagan, in such termination systems, incoming trunks are extended, usually underground, from a central office to a distribution frame usually located in a basement or other utility area of an office building. The incoming lines are then fed to second terminal blocks located in individual floor riser closets for connection to equipment also located in each closet which operates in conjunction with the key telephones to selectively provide multi-line connections and the associated functions of holding, ringing, lamp lighting and the like which are usually provided with key telephone service.

From an initial installation standpoint, the Verhagan system is less expensive than systems heretofore employed. For example, the terminal blocks and switching and signaling equipment are located in the floor riser closets and the individual key telephones are, of course, located at various positions throughout the building. It is therefore necessary to run a multiplicity of conductors for each line connectible to each key telephone to accommodate the associated functions for holding, ringing, lamp lighting and the like. These conductors are known in the art as "raw" cable. The raw cable is usually a 25 pair, solid conductor, color coded, insulated cable and the extension of such cable between the terminal blocks in the riser closets and the key telephones throughout a building becomes quite expensive in that the same is usually permanently installed in the first instance and left unconnected within the walls when reconfiguration of the system will not permit the use of the same cables because the same are either too short to extend to a new position, or cannot be removed and reused.

According to Verhagan, a modular interchange termination system includes a terminal block for receiving the incoming lines to an office building from a telephone central office. This terminal block is located in a utility closet in the basement or other utility area of the building. The individual lines, often called house lines or house local, are then extended upwardly through the risers of the building which may advantageously be located adjacent an elevator shaft or the like for distribution to the individual floors of the office building. A riser closet is usually located on each floor adjacent to or within the risers. A modular interchange termination system is located in each of these closets and serves the key telephones which are located about the respective floor of the building. The raw cable is extended from the modular interchange termination system to specific locations for connection to the individual telephone instruments. Again, the raw cable is a permanent type wiring and usually extends through conduits in the floor, walls and/or ceiling. The raw cable is connected to the termination system by means of separable connectors having the necessary number of individual matable contacts. The distal ends of these cables are also provided with separable connectors by which individual telephones may be connected, via the cables, to the modular interchange termination system.

The modular interchange termination system includes modules which are similar to the aforementioned CCB panels, and which have a plurality of programmable contacts which may be selectively interconnected by means of plug-in jumper connections, often called patchcords. The contacts of each module are arranged in horizontal and vertical rows which bear similar indicia in the form of color coding to aid in the identification of individual lines which bear corresponding color coding for ease in installation and maintenance.

Three types of modules, all similar in construction, are provided by Verhagan in his modular system. Each of the modules comprises a front panel which carries a plurality of contacts arranged in an array or matrix of rows which extend perpendicular to each other. For convenience, these rows may be thought of as horizontal rows and vertical rows. On the front side of the first panel the contacts, and their surrounding installation, constitute receptacle-type connections for receiving cooperable mating plug-type connections of patch cord connectors. On the rear side of the first panel, the contacts are adapted for a wrapped wire connection, an insulation-pierce connection, or the like. A back panel is connected to the front panel by means of a plurality of stand-off posts. The back panel mounts a plurality of mating connector units each having a plurality of contacts. The contacts of the connector units are interconnected by individual wires, printed circuit conductors or the like to the contacts mounted on the front panel. Each of the mating connector units mounted on the rear panel is connectable to a complementary mating connector unit.

One of the modules is known as the "green field" and is associated with the incoming lines which enter, from the first terminal block, by way of the mating connectors mounted on the rear panel. Advantageously, the green field is thought of as being oriented vertically with adjacent vertical pairs of contacts identifying an incoming line.

The green field is connected to one of more second modules called the "red field."

Each red field receives the incoming lines from the green field, via path cords, and extends the incoming lines to the switching and signaling equipment and key telephone function lines from the signaling and switching equipment back to the red field by way of at least one cable connected by way of a mating connector mounted on the back panel. The red field is generally thought of as being oriented horizontally in groups of rows with the first two rows of each group identifying the incoming telephone line and the remaining rows of a group identifying an extension of that line toward a key telephone along with the switching and signaling functions of that key telephone. The red field is connected by way of patch cords to a "blue field."

The blue field has each vertical row of contacts connected to a separate key telephone by way of the connector mounted on the rear panel, the raw cable for the telephone, and a separable electrical connector at the distal end of the raw cable. Inasmuch as each key telephone is assigned a vertical row of the blue field, and as the red field extends lines in a horizontal arrangement to the blue field, each vertical row of the blue field may provide connections for a plurality of outside lines to each key telephone, and this service may altered, at will, by means of the patch cords. In addition, inasmuch as each key telephone is connected to the blue field by way of a raw cable and a pair of electrical connectors at each end of the cable, a relocation of telephones and telephone service may be readily accomplished by disconnecting and connecting the distal end connectors and/or by interchanging the connectors at the rear panel of the blue field. The system therefore exhibits complete flexibility in service and maintenance.

As mentioned above, each of the telephone lines is color coded and the insulators surrounding each of the panel-mounted contacts is similarly color coded so that service personnel are immediately advised as to line identification. Also, the provision of the electrical connectors mounted on the rear panels provides ease of access for line and equipment testing purposes.

One may refer to U.S. Pat. No. 3,970,802 granted July 20, 1976, to John Peter Nijman and assigned to Bunker Ramo Corporation, which illustrates the modules disclosed by Verhagan and adapted for printed circuit connections between the front panel-mounted contacts and the rear panel-mounted electrical connector units.

SUMMARY OF THE INVENTION

Although the above-discussed modular system has proven to be extremely flexible with respect to system design, installation, service and maintenance, the modules require a number of individual parts which are assembled by hand.

It is therefore highly advantageous to have and a primary object of the present invention to provide an improved modular structure having fewer parts than heretofore known, and thus requiring less time to assemble.

Another object of the invention is to provide a modular interchange termination system in which each module comprises a one-piece construction having a panel mounting an array of contacts and rear projections extending from the panel and directly mounting the connector units thereon in spaced relation to the termination portions of the panel-mounted contacts.

Another object of the invention is to provide an interchange termination module which is adapted for machine connection of conductors at the termination portions of the panel-mounted contacts, and in particular adapted for machine termination into insulation-piercing termination portions of the panel-mounted contacts.

Another object of the invention is to provide a patch cord connector having insulation-piercing termination portions of the patch cord contacts and a patch cord connector construction which functions to perform the insulation-pierce operation in connecting the patch cord conductors to the insulation-piercing portions of the patch cord connector contacts.

According to the invention, a module comprises a one-piece molded structure including a panel which has a generally planar front surface and a plurality of projections extending from its rear surface. Some of the projections extending from the rear surface are oriented in an array which defines the contact arrary, these projections including contact passageways which extend completely through the module. The individual contacts are inserted into the passageways and include means for retaining the contacts with respect to forward and rearward movement, this means preferably being in the form of laterally extending barb-shaped flanges.

Others of the rearwardly extending projections extend adjacent the lateral edges of the panel. These projections directly mount mating electrical connector units, such as the Series 57 connector manufactured by the Amphenol Industrial Division of Bunker Ramo Corporation. These projections are arranged in pairs and spaced apart in accordance with the mounting hole center dimensions of the mounting flanges of the particular electrical connector employed. The connector mounting projections extend from the rear surface of the panel a greater distance than the first-mentioned projections and are located laterally thereof outside of the area of the contact array. Therefore, space is provided for electrical connections between the mating connector units and the panel-mounted contacts. The electrical connections may be individual wire connections and the arrangement is ideal for flex circuitry or P.C. connections.

In order to condense the size of a module, the connector mounting projections which are aligned adjacent the lateral edges of the panel are also located as close together as possible with each second projection of an aligned row of projections extending a fixed distance farther than the adjacent projection. With this structure, each of the mating electrical connector units is mounted at a slight angle with respect to the plane of the panel so that the cable attached thereto is directed over the adjacent connector.

It should be pointed out that hereinafter the term "connector unit" should be taken to mean one of two complementary, cooperable, mating parts which, when mated, constitute a "connector".

Inasmuch as one connector unit may be matable with other connector units of different overall dimensions in the engagement-disengagement direction, and as it is desirable to releasably latch or secure the mated connector units together, a band is provided to extend about a pair of laterally disposed connectors and engage the lateral edges of the panel. At each point of engagement, the panel is provided with a pair of spaced shoulders which are selectively engaged by an edge surface of the band. The spacing of the shoulders accommodates connectors of different dimension in the engagement-disengagement direction. The bands also serve as guards to protect the exposed contact tails on the rear of the module.

A patch cord connector comprises a base having a plurality of legs extending therefrom, each of the legs having a groove therein which is aligned with a contact passageway in the base. A patch cord contact extends through each passageway and includes an active portion having a bow shape disposed in the groove of a respective leg, and a termination portion extending at substantially 90° with respect to the base and including an insulation-piercing notch defined by a pair of tines. A post extends from the base behind each of the contact terminating portions. A cover is hinged to the base and includes a plurality of longitudinal conductor-receiving bores therein, a first plurality of openings intersecting the bores and a second plurality of openings intersecting the bores. The conductors are inserted into the conductor-receiving bores and the cover is rotated to a position at which the terminating portions of the contacts enter respective ones of the first openings to pierce the insulation and make contact with the respective conductors. The posts are received in the second openings and force the respective conductors away from the base and into portions of the respective second openings to provide strain relief. The cover and base are provided with a groove and hook structure for latching the cover in the closed position.

Each of the openings on the front side of the panel is shaped so as to receive the legs of the patch cord connector in a predetermined orientation, thus polarizing the patch cord connector with respect to the panel. Each contact passageway in the panel is provided with a laterally extending detent and each leg of the patch cord connector is provided with a laterally extending projection which, in the first instance, urges the contact carried by the leg into a wiping engagement with the respective panel-mounted contact during insertion of the patch cord connector, and which is received in the detent as a positive seat to indicate complete mating. The detent and the projection have cooperable mating oblique surfaces ankled in the direction of withdrawal in order to ease disengagement and withdrawal of the patch cord connector.

In the aforementioned Verhagan system, each of the panel-mounted contacts is supported in an insulator of a particular color, and the rows of contacts identify lines and functions in accordance with the color coding of the conductors of the telephone lines. A corresponding color coding is employed in the present modules by the provision of one or more color-coded strips in the form of an adhesive strip affixed to the front surface of the panel. Color coding to identify different fields, such as the red field, may advantageously be accomplished in the same manner through the utilization of an adhesive color strip on the front side and/or the rear side of the panel.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENT

Figure 1:
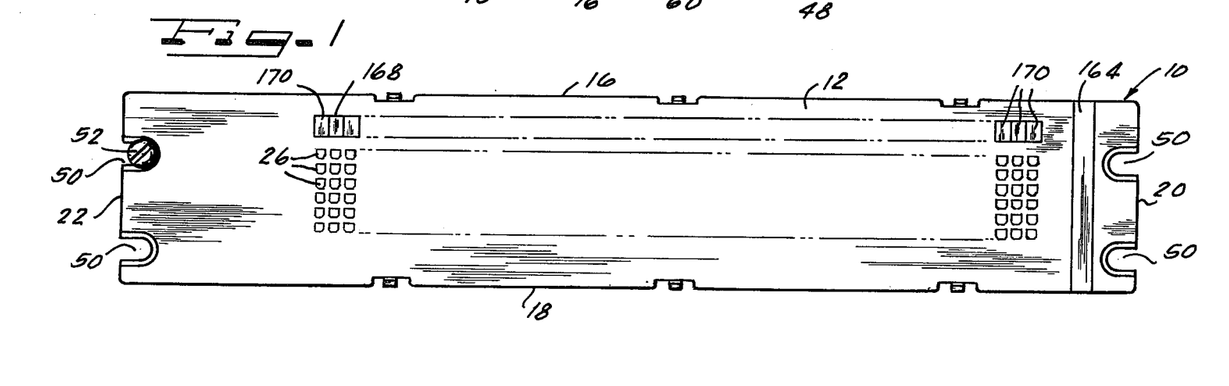
FIG. 1 is a plan view of the front side of a module constructed in accordance with the present invention.
Figures 2, 3:
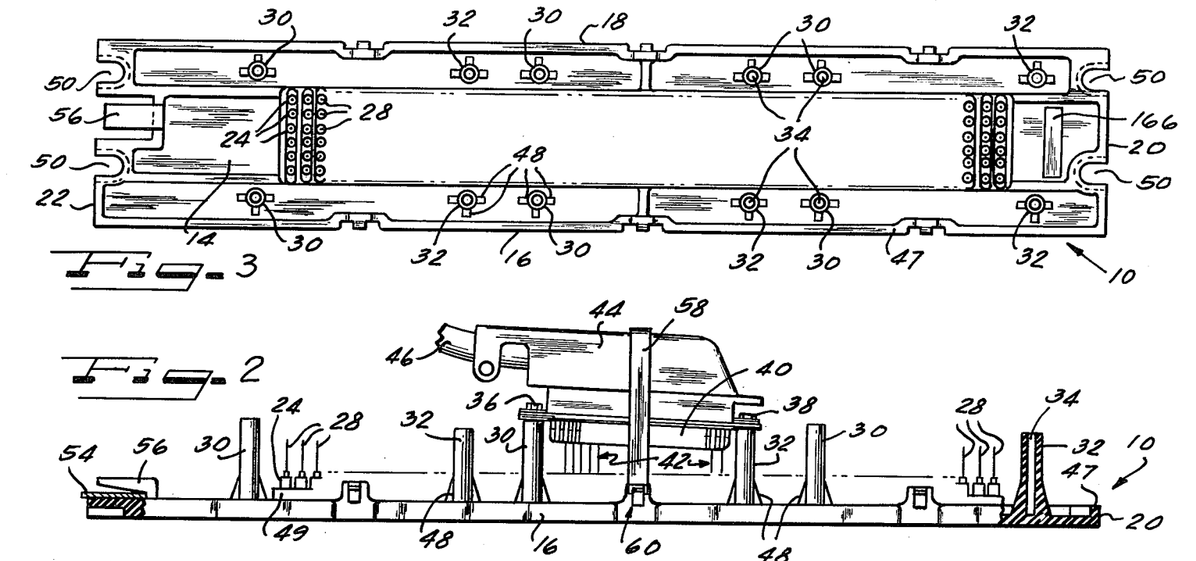
FIG. 2 is an elevation view of the module of FIG. 1 showing the mounting of electrical connectors on the rear side of the panel.
FIG. 3 is a plan view of the rear side of the module of FIG. 1.

Referring first to FIGS. 1–3, an interconnection and termination module is generally illustrated at 10 as comprising a panel having a front side 12 and a rear side 14, and having a pair of lateral longitudinal edges 16 and 18, a top end 20 and a bottom end 22. Extending from the rear side 14 is a plurality of projections 24 each having a contact passageway 26 therethrough which opens at the front side 12. The projections 24 are arranged in an array or matrix of longitudinally and laterally extending rows. A plurality of contacts 28 are mounted in the passageways 26 and thus assume the same array of longitudinally and laterally extending rows. The contacts are illustrated in greater detail in FIGS. 4–7 and will be discussed in detail in connection with those figures.

A second plurality of projections extend from the rear side 14 of the panel, the second extensions being disposed in alignment adjacent the lateral edges 16 and 18 and in spaced pairs 30 and 32. Each of the second extensions 30 and 32 extend a greater distance from the panel than the projections 24, and each of the projections 30 extends a greater distance than the projections 32, as is evident from FIG. 2 and as will be appreciated from the following discussion concerning the mounting of corresponding mating connector units.

Each of the projections 30 and 32 includes a bore 34 for receiving a respective screw 36, 38 which extend through respective end flanges of and secure a mating connector unit 40 to the projections 30 and 32. As mentioned above, each of the mating connector units includes an active portion for engagement with a corresponding contact of a complementary connector unit, here the connector unit 44, and a terminating portion for connection to the panel-mounted contacts 28. These latter connections are schematically indicated at 42, and it will be appreciated that the positioning of the connector units along the lateral edges of the panel and outwardly from the panel a greater distance than the projections 24 provides an adequate interconnection space. As with the above-discussed Verhagan system, each connector unit 40 is electrically connected to the contacts 28 of a predetermined row or predetermined rows of contacts, depending on the particular application of the module as a green field, red field or blue field.

As will be readily appreciated from FIG. 2, the slight difference in length between the projections 30 and 32 cause the connector unit 40 and its complementary connector unit 44 to be disposed at a slight angle with respect to the plane of the panel. This tilting of the electrical connectors guides the cable 46 rearwardly and over an adjacent electrical connector.

Inasmuch as the module 10 is a one-piece molded construction, molded from an insulative material, such as Valox-420-SE-0, of the General Electric Company, or an equivalent material, and as it is desired to provide a rigid structure, the module is molded to have a peripheral ridge 47. Additional rigidity and strength is added to the projections 30 and 32 by the molded web flanges 48, and the central portion of the panel may be strengthened by a raised portion 49 from which the projections 24 extend. The projections 24 may be individual per contact or common for a row of contacts.

In order to secure the module 10 to a frame, a plurality of countersunk slots 50 is provided at the upper end 20 and at the lower end 22, for receiving respective fasteners, such as a screw 52. An L-shaped projection extends from the rear side 14 adjacent the bottom end 22 so that the module may be hooked over a frame member 54 (FIG. 2), whereupon a screw may be installed at the upper end to temporarily hold the module in place and free the hands of the installer for completion of installation of the module.

Figures 4, 5:
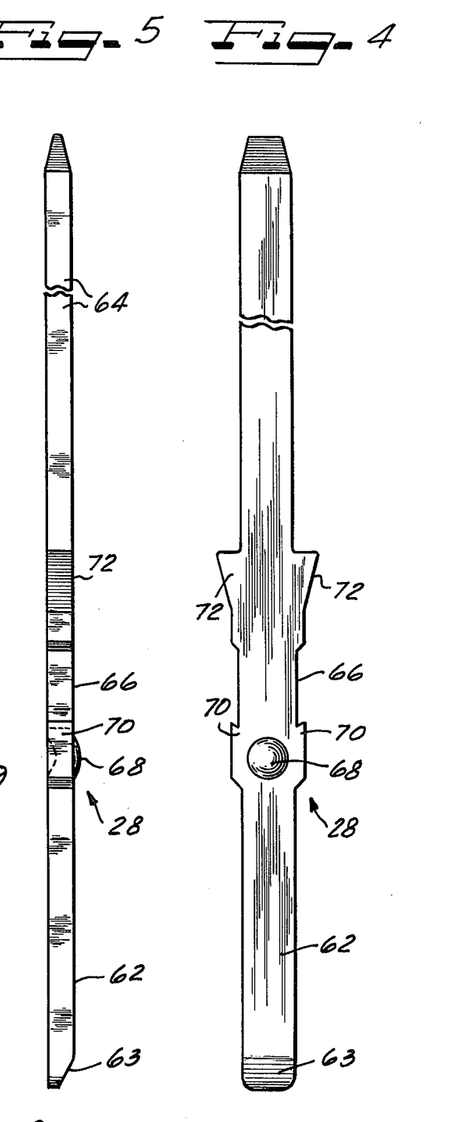
FIG. 4 and FIG. 5 are side and edge views of a panel contact having a termination portion in the form of a wrapping post.

FIGS. 4 and 5 illustrate a panel contact 28 as comprising an active portion 62, a termination portion 64, shaped as a wire wrapping post, and an intermediate portion 66. The intermediate portion 66 includes a detent 68 which bears against one wall of the contact passageway and forces the active portion 62 against the opposite wall. The intermediate portion 66 also includes a pair of lateral barb-shaped flanges 70 and a pair of lateral flanges 72 which extend laterally a greater distance than the flanges 70. The contact 28 is inserted into the passageway from the rear to an extent where the flanges 72 come to rest with the rear edges thereof generally aligned with the rear of the respective projection 24. The width of the contact 28 across the widest point of the flanges 72 causes resistance to further forward movement of the contact, and thus resist removal of the contact from the front of the panel. As the contact progresses through the passageway, there is a plastic flow of material behind the sharp corners of the barb-shaped flanges 70; therefore, the flanges 70 resist contact movement toward the rear and thus resist contact removal from the rear.

The active portion 62 of the contact 28 includes an entry taper defined by an oblique surface 63 for guiding the corresponding contact of the patch cord connector into proper alignment with the contact 28.

Figure 6:
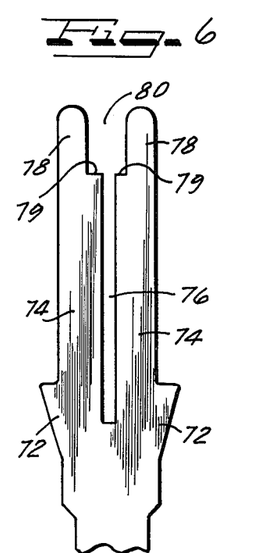
FIGS. 6 and 7 are side and edge views of a panel contact having an insulation-piercing termination portion.
Figure 7:
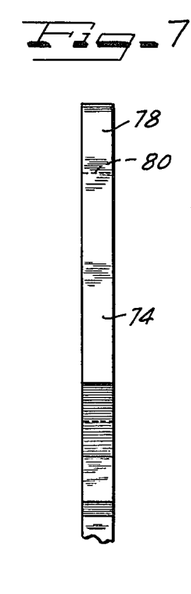

FIGS. 6 and 7 illustrate the provision of a contact structure which is substantially identical to the contact illustrated in FIGS. 4 and 5 with respect to the active and intermediate portions. The contact illustrated in FIGS. 6 and 7, however, has a rear portion in the form of an insulation-piercing structure which comprises a pair of spaced rearwardly extending legs 74 defining a slot 76 therebetween. Each of the legs 74 terminates in an end portion 78 which is spaced from the end portion of the other leg a greater distance than the spacing between the legs 74 to provide a larger slot 80. In order to connect an individual conductor to the insulation-piercing portion of the contact, the conductor is dressed into the slot 80 and held therein by the end portions 78. An insulation tool then forces the conductor into the slot 76 whereupon the corners 79 open the insulation and the edges of the legs 74 engage the conductor. A plurality, for example one row, of contacts may be dressed with conductors at one time and moved into a multi-tool insertion machine for simultaneous termination, after which a second plurality of contacts are terminated in a similar manner, and so on until the entire complement of contacts is terminated.

Figure 8:
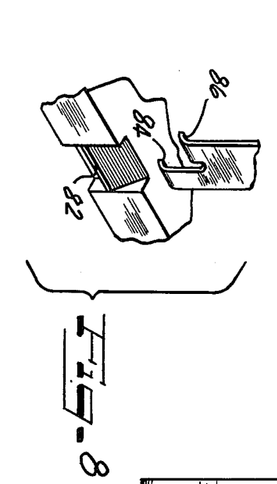
FIG. 8 is a fragmentary view of a portion of a mating connector unit latching mechanism for different sized connector units.
Figure 9:
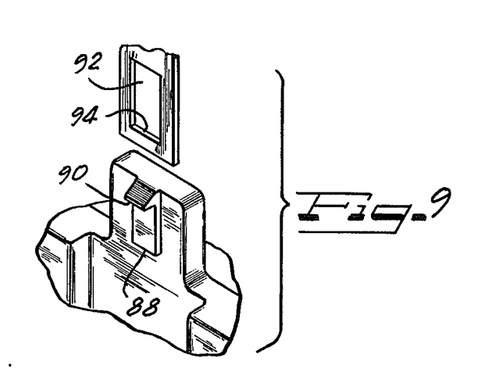
FIG. 9 is a fragmentary view of another embodiment of a latch mechanism for different sized connector units.

Inasmuch as it is desirable that the mating connector units 44 be completely engaged with the mating connector units 40, and as it is desirable that the connector units 44 be freely interchangeable for connection to any of the connector units 40 mounted on a panel, and as it is possible that the connector units 44, or for that matter the connector units 40, do not always have the same dimension in the engagement-disengagement direction, in FIG. 2 a U-shaped strap 58 is provided to releasably latch the connectors with an adjustable-stage latch mechanism 60. Referring to FIG. 8, one latch mechanism is illustrated wherein the panel is provided with a lateral ramp-shaped projection 82 and the band 58 has the corresponding end thereof shaped in the form of a pair of hooks 84 and 86. For a connector unit 44 which has a larger hood, for example, the hook 84 would engage the projection 82 as a first latching stage, whereas a shorter hood would require that the hook 86 engage the projection 82. Although only two latching stages have been illustrated, it is readily apparent that a plurality of such stages may be utilized, and the flexibility of the U-shaped band 58 permits the band to engage a connector unit 44 of one dimension and a parallel-mounted connector unit of another dimension so that one side of the module is latched at the first stage while the other side is latched at the second stage. A somewhat similar latch mechanism is illustrated in FIG. 9 in which the edge of the panel is provided with a pair of latch edges 88 and 90, the latch edge 90 being formed in a ramp-shaped fashion. In this embodiment, the band 58 includes an aperture 92 therein having an edge 94 for engaging the edge 90 as a first latching stage and engaging the edge 88 in a second latching stage. Again, one side may be latched at the first stage while the other side is latched at the second stage.

Figures 10, 11, 12, 13, 14:
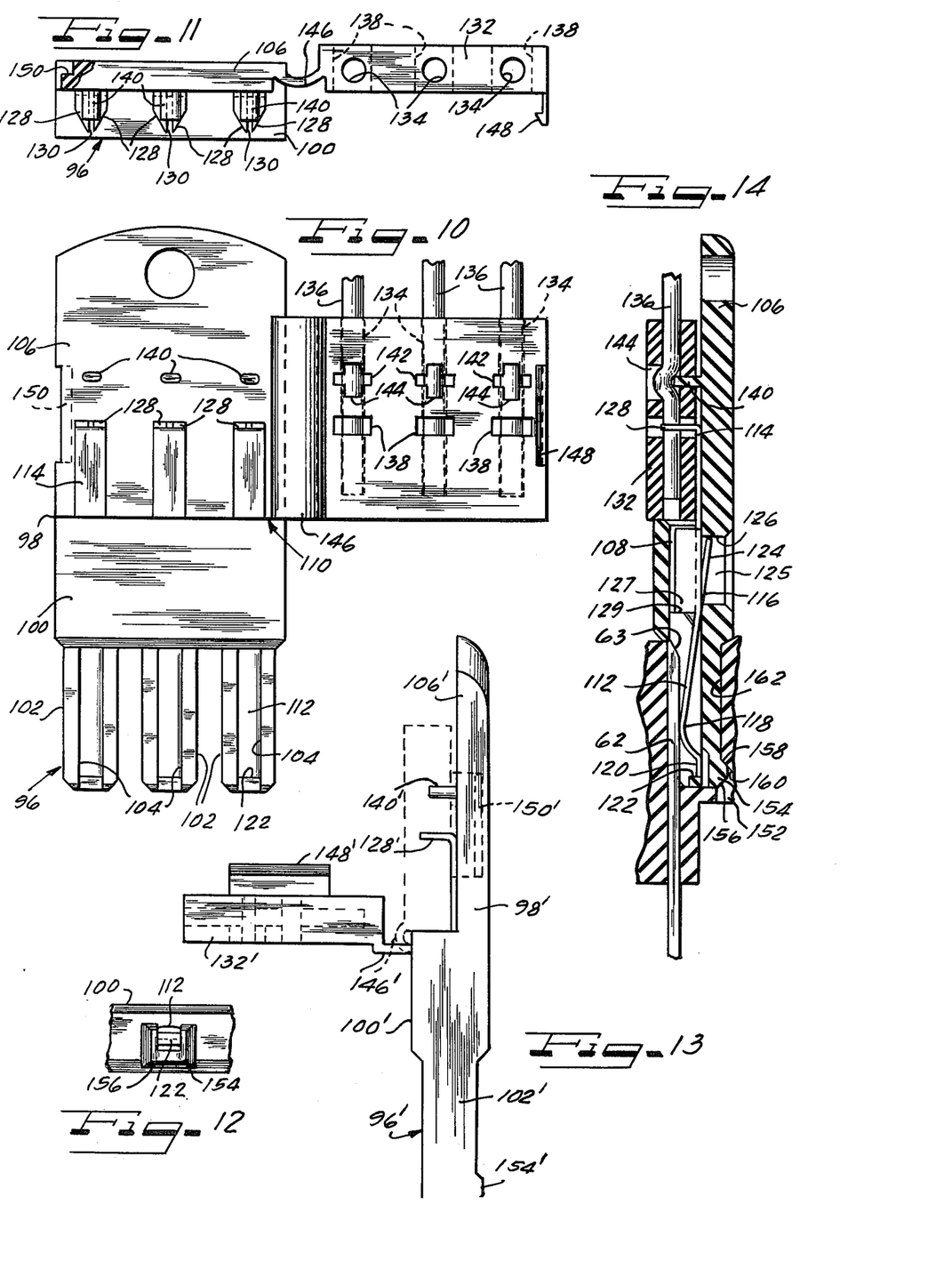
FIG. 10 is a plan view of a patch cord connector having insulation-piercing contacts for the patch cord conductors.
FIG. 11 is a top view of the patch cord connector of FIG. 10 specifically illustrating a latch between the cover and base of the patch cord connector.
FIG. 12 is a bottom end view of a portion of the patch cord connector illustrated in FIG. 10.
FIG. 13 is a side view of a patch cord connector, similar to that illustrated in FIG. 10, having a different hinge construction.
FIG. 14 is a sectional view of a patch cord connector mated to the panel.

Referring now to FIGS. 10-14, patch cord connectors and their interengagement with the panel are illustrated. Turning first to FIGS. 10-12 and 14, a patch cord connector 96 is illustrated as comprising a base 98 having a portion 100 from which a plurality of legs 102 extend. Each of the legs 102 includes a groove 104. In the opposite direction, the base 98 includes a portion 106 which, as can be best seen in FIG. 11, is thinner than the portion 100. The portion 100 includes a plurality of contact passageways 108 (FIG. 14) for receiving a respective contact 110 therein. Each of the contacts 110 comprises an active portion 112 disposed in a groove 104 of a leg 102, a termination portion 114 constructed as an insulation-piercing contact portion, and an intermediate portion 116 which is housed within the base portion 100.

The active portion 112 includes a bow section 118 for engaging the active portion 62 of the respective panel mounted contact. The active portion 112 also includes an end 120 which engages a shoulder 122 adjacent the end of the leg 102 to prevent the contact tip from being cracked. The intermediate portion 116 includes a long beam section 124 which engages a shoulder 126 of the base portion 100 to resist rearward movement of the contact. The contact 110 may be removed by depressing the long beam section 124, access being had through an aperture 125. At least one flange 127 also engages a shoulder 129 within the passageway 108 to resist forward movement of the contact and the ridge which forms the shoulder 122 acts as an initial guide for the entry taper 63 of the active portion of the panel contact.

The termination portion 114 includes a pair of spaced legs 128 extending at generally 90° from the contact to define an insulation-piercing notch 130.

A cover 132 is hinged to the body portion 106 by a web 146 and has a thickness which is substantially the difference in thickness between the body portions 100 and 106. The cover 132 includes a plurality of longitudinal bores 134 for receiving respective insulated patch cord conductors 136. The cover 132 includes a first plurality of openings 138 therein which intersect the bores 134 and which receive the insulation piercing projections 128 to contact the respective conductors 136 when the cover 132 is rotated at the hinge 146 to color the body portion 106. The cover 132 includes a hook-shaped element 148 which engages a shoulder 150 provided in the body 106 to releasably latch the cover 132 in the closed position.

Strain relief is provided in that the body portion 106 carries a plurality of projections 140 which are spaced from and aligned with the insulation-piercing projections 128. The cover includes a corresponding plurality of intersecting openings 142 for receiving the projections 140. The cover 132 also includes another plurality of openings 142 having longitudinal axes parallel to the longitudinal axes of the conductors 136. As the projections 140 engage the respective conductors 136, the conductors are deformed and pressed into the openings 142. The deformation of the conductors 136 about the projections 140 provides a strain relief from tensile forces applied to the conductors to prevent dislodgement thereof from the insulation-piercing notches 130.

It will be noted in FIG. 12 that the active portions lie completely within the grooves 104 and below the outer surfaces of the legs 102 so that the active portions are protected when disengaged from the panel.

It will also be noted in FIG. 14 that each contact passageway within the panel includes a detent 152 which receives a projection 154 adjacent the end of the corresponding leg 102. The detent 154 includes a first tapered surface 156 which functions as an entry guide taper during insertion of the patch cord connector, and a second tapered surface 158 which engages a complementary tapered surface 160 of the detent 152 to ease withdrawal of the patch cord connector. During insertion, the projection 154 slides along the wall surface 162 of the contact passageway of the panel, thereby urging the active portion 112 into a wiping engagement with the active portion 62 of the panel-mounted contact. Upon detenting, the bow shape of the active portion 112 maintains electrical contact between the mated contacts.

Referring now to FIG. 13, a patch cord connector 96' is illustrated which is the same in all respects as the patch cord connector 96, with the exception that the cover 132' is hinged to the base portion 100' at a hinge 146', rather than to the portion 106'. If the cover 132 or 132' is to be separate from and not hinged to the body 98 or 98' the parts may be molded from the aforementioned Valox material, or an equivalent material. However, such material is too brittle for the hinged construction and a polypropylene or nylon material would be preferred.

Returning now to FIGS. 1 and 3, the front panel is provided with an adhesive strip 164 having a color, such as green, red, blue, to identify the type of connection field. A similarly colored adhesive strip 166 may also be applied to the rear side 14 to identify the module from the rear.

An adhesive strip 168 is applied to the front panel alongside the array of contacts, the strip 168 including individual color sections 170 which correspond to the color coding of the conductors of the telephone lines. The strip 168 may take other forms and include additional sections for receiving writing, and may be in the form of a longitudinally folded strip which would provide three "pages" of color and/or written information.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Modular interconnection apparatus comprising:
   connector
   a plurality of contacts, each of said contacts including an active portion, a terminating portion, and an intermediate portion between said active and termination portions;
   a one-piece support mounting said plurality of contacts in rows, said support including
   a panel having a front side and a rear side,
   a plurality of first projections extending from said rear side, said projections arranged in said rows,
   a plurality of contact passageways each extending through a respective first projection and through said panel, each of said passageways receiving and mounting a respective contact with said intermediate portion in said first projection and said termination portion extending rearwardly of said first projection, and
   a plurality of second projections extending from said rear side; and
   a plurality of mating electrical connector units mounted on said second projections, each of said connector units including a plurality of contacts each having a termination portion and a mating portion, said mating portions adapted for engaging contacts of a complementary mating electrical connector unit, said termination portions of said contacts of a row of contacts electrically connected to respective termination portions of said contacts of a respective mating electrical connctor unit thereby associating each row of contacts with a separate electrical connector unit.

2. Modular interconnection apparatus comprising:
   a plurality of contacts, each of said contacts including an active mating portion, a conductor termination portion, and an intermediate portion between said active and termination portions;
   a one-piece support mounting said plurality of contacts in rows, said support including
   a panel having a front side and a rear side,
   a plurality of contact passageways arranged in rows and extending through said panel, each of said passageways receiving and mounting a respective contact therein with said termination portion extending from said rear side, and
   a plurality of projections extending from said rear side; and
   at least one mating electrical connector unit mounted on at least one of said projections, said electrical connector unit including a plurality of contacts each having a mating portion adapted to engage a contact of a complementary mating electrical connector and a conductor termination portion, said conductor termination portions electrically connected to respective ones of said conductor termination portions of said contacts of at least one of said rows.

3. Modular interconnection apparatus according to claim 2, wherein
   said panel comprises longitudinal edges,
   said projections extend rearwardly from said panel adjacent said longitudinal edges, and
   said apparatus comprises a plurality of said mating electrical connectors mounted on said projections with said conductor termination portions thereof electrically connected to said conductor termination portions of said contacts of at least one row of contacts.

4. Modular interconnection apparatus according to claim 2, wherein
   said panel comprises a pair of longitudinal edges,
   and said apparatus comprises means releasably engaging said edges and extending about the rear of said panel to embrace and secure complementary connector units when mated with said connector units which are mounted on said projections.

5. Modular interconnection apparatus according to claim 2, wherein said panel includes a plurality of openings therein to receive fasteners therethrough for securing said panel to an equipment rack.

6. Modular interconnection apparatus comprising:
   a plurality of contacts, each of said contacts including an active portion, a termination portion, and an intermediate portion between said active and termination portions;
   a one-piece support mounting said plurality of contacts in rows, said support including
   a panel having a front side and a rear side,
   a plurality of contact passageways arranged in rows and extending through said panel, each of said passageways receiving and mounting a respective contact therein with said termination portion extending from said rear side, and
   a plurality of projections extending from said rear side;
   at least one mating electrical connector unit mounted on at least one of said projections, said electrical connector unit including a plurality of contacts each having a mating portion adapted to engage a contact of a complementary mating electrical connector and a termination portion, said termination portions electrically connected to respective ones of said termination portions of said contacts of at least one of said rows;
   a complementary mating electrical connector mated to said mounted electrical connector; and
   means for releasably securing said complementary electrical connector to said panel.

7. Modular interconnection apparatus according to claim 6, wherein the last-mentioned means comprises:
   a shoulder extending from said panel; and
   a band having a pair of ends, each of said ends including a pair of spaced hooks for selectively engaging said shoulder.

8. Modular interconnection apparatus according to claim 6, wherein the last-mentioned means comprises:
   a pair of shoulders on each edge of said panel spaced apart in the direction of the thickness of said panel; and
   a band including a pair of ends each of said ends including a surface for selectively engaging a hook on a respective edge of said panel to accommodate connectors of different dimensions in the direction extending rearwardly of said panel.

9. Modular interconnection apparatus according to claim 6, wherein the last-mentioned means comprises:
   a plurality of shoulders extending laterally from each lateral edge of said panel; and
   a U-shaped band including end portions each having a surface for selective engagement with a shoulder on the respective edge of said panel to accommodate connectors of different dimensions in the direction extending rearwardly of said panel.

10. Modular interconnection apparatus according to claim 9, wherein each end of said band includes a rearwardly facing edge defining said surface which engages said shoulders.

11. Modular interconnection apparatus comprising:
a plurality of contacts, each of said contacts including an active mating portion, a conductor termination portion, and an intermediate portion between said active and termination portions;
a one-piece support mounting said plurality of contacts in rows, said support including
a panel having a front side and a rear side,
a plurality of contact passageways arranged in rows and extending through said panel, each of said passageways receiving and mounting a respective contact therein with said termination portion extending from said rear side, and
a plurality of projections extending from said rear side; and
at least one mating electrical connector unit mounted on at least one of said projections, said electrical connector unit including a plurality of contacts each having a mating portion adapted to engage a contact of a complementary mating electrical connector and a conductor termination portion, said conductor termination portions electrically connected to respective ones of said conductor termination portions of said contacts of at least one of said rows,
each of said panel-mounted contacts comprising
first means engaging said passageway to resist movement in the forward direction, and
second means engaging said passageway to resist movement in the rearward direction.

12. Modular interconnection apparatus comprising:
a plurality of contacts, each of said contacts including an active portion, a termination portion, and an intermediate portion between said active and termination portions;
a one-piece support mounting said plurality of contacts in rows, said support including
a panel having a front side and a rear side,
a plurality of contact passageways arranged in rows and extending through said panel, each of said passageways receiving and mounting a respective contact therein with said termination portion extending from said rear side, and
a plurality of projections extending from said rear side;
at least one mating electrical connector unit mounted on at least one of said projections, said electrical connector unit including a plurality of contacts each having a mating portion adapted to engage a contact of a complementary mating electrical connector and a termination portion, said termination portions electrically connected to respective ones of said termination portions of said contacts of at least one of said rows;
a plurality of insulated conductors; and
a patch cord connector comprising a plurality of contacts each including an active portion for engaging a respective active portion of a panel mounted contact, an insulation-piercing portion, a first connector body portion supporting said contacts and a second connector body portion movable with respect to said first connector body portion including conductor-receiving openings therein and openings transverse to and intersecting said conductor-receiving openings to receive said insulation-piercing portions of said contacts, said insulation-piercing portions contacting said conductors.

13. Modular interconnection apparatus according to claim 12, wherein:
said first body portion includes a plurality of contact passageways therethrough each receiving and mounting a respective one of said patchcord contacts, and a plurality of legs, each of said legs including a groove aligned with a respective contact passageway, said groove supporting and protecting said active portion of the contact mounted in the respective contact passageway.

14. Modular interconnection apparatus according to claim 13, wherein said contact passageways on the front side of said panel and said legs of said patchcord connector have complementary asymmetric cross-sectional shapes to prevent engagement therebetween in improper orientations.

15. Modular interconnection apparatus according to claim 12, wherein:
each of said patchcord contacts is constructed with said insulation-piercing portion extending outwardly of said first body portion; and
said second body portion is hinged to said first body portion to rotatably carry said insulated conductors into engagement with said insulation-piercing contacts.

16. Modular interconnection apparatus according to claim 15, wherein:
said second body portion includes recesses intersecting said conductor-receiving openings; and
said first body portion includes projections extending therefrom to be received in said recesses to engage and provide strain relief for said conductors.

17. Modular interconnection apparatus according to claim 15, comprising latch means on said first and second body portions for latching said portions together when said conductors have been rotated into engagement with said insulation-piercing contacts.

18. Modular interconnection apparatus according to claim 17, wherein one of said body portions includes a groove therein and the other of said body portions includes a resilient hook to snap into said groove.

19. Modular interconnection apparatus for selectively extending electrical connections between patchcord connectors and a plurality of multiconductor cables, comprising:
a plurality of contacts, each of said contacts including an active portion, a termination portion and an intermediate portion between said active and termination portions;
a one-piece support of molded insulating material mounting said contacts in rows, said support including
a panel having a front side, a rear side, and lateral edges,
a plurality of first projections extending from said rear side, said first projections arranged in said rows,
a plurality of contact passageways extending through respective first projections and through said panel, said contacts mounted in said passageways with said termination portions extending from said first projections, said intermediate portions within said first projections and said active portions below the surface of said front side to contact the patchcord connectors in a plug-in relation within said passageways, and a plurality of second projections extending aligned in rows from said rear side adjacent said lateral edges;

a plurality of first mating electrical connector units mounted on said second projections, each of said first mating electrical connector units including a plurality of contacts each of which includes a mating portion and a termination portion, said termination portions of each connector unit electrically connected to said termination portions of said panel-mounted contacts of at least one row of said contacts; and a plurality of second mating electrical connector units mated with said first connector units, each of said second connector units of contacts each including a termination portion electrically connected to a respective conductor of a respective cable and a mating portion for engaging a corresponding mating portion of a first mating electrical connector unit associating at least one row of the panel-mounted contacts with a separate cable, said second mating electrical connector units being completely interchangeable with each other to freely associate rows of panel-mounted contacts and cables.

20. Modular interconnection apparatus according to claim 19, wherein said second projections extend further from said rear side than said first projections, each of said first connector units is mounted on a pair of adjacent aligned second projections, and one of said second projections of each said pair being longer than the other to provide an angular disposition of a mated pair of said first and second connector units to in turn provide clearance of the cables to extend over adjacent mated connector units.

21. Modular interconnection apparatus according to claim 20, comprising:

a plurality of shoulders extending from said lateral edges, spaced in the direction of the thickness of said panel, at locations between each said pair of said second projections, said pairs of second projections also aligned transversely of said panel; and a plurality of U-shaped bands, each of said bands including end portions having apertures therein with edges for engaging selected ones of said spaced shoulders on opposite edges of said panel.

22. A patchcord connector for terminating a plurality of insulated conductors, comprising a plurality of electrical contacts, each of said contacts including an active portion, an insulation-piercing portion extending generally perpendicular to said active portion, and an intermediate portion, a housing including a first body portion, a second body portion hinged to said first body portion, a plurality of spaced legs extending from said first body portion, each of said legs including side and bottom walls defining a groove for supporting and protecting an active portion, a plurality of contact passageways in said first body portion aligned with said grooves and securing said intermediate portions therein, said second body portion including a plurality of conductor-receiving bores therein for rotatably carrying the insulated conductors toward said first body portion, and said second body portion including openings intersecting said bores for receiving said insulation-piercing contact portions to engage the conductors upon rotation of said second body portion toward said first body portion.

23. Modular interconnection apparatus comprising:

a plurality of contacts, each of said contacts including an active portion, a termination portion, and an intermediate portion between said active and termination portions;

a one-piece support mounting said plurality of contacts in rows, said support including a panel having a front side and a rear side, a plurality of contact passageways arranged in rows and extending through said panel, each of said passageways receiving and mounting a respective contact therein with said termination portion extending from said rear side, and a plurality of projections extending from said rear side; and at least one mating electrical connector unit mounted on at least one of said projections, said electrical connector unit including a plurality of contacts each having a mating portion adapted to engage a contact of a complementary mating electrical connector and a termination portion, said termination portions electrically connected to respective ones of said termination portions of said contacts of at least one of said rows, each of said contact passageways comprising a pair of spaced sidewalls, said active portion bearing against one of said sidewalls, and a detent in the other of said sidewalls; and a patchcord connector including patchcord contacts, legs partially surrounding and supporting said patchcord contacts, each of said legs including a latch projection to be received in said detent.

24. Modular interconnection apparatus according to claim 23, wherein each of said patchcord contacts comprises a bowed active portion for wiping engagement with said active portion of a panel mounted contact, the wiping pressure being increased during insertion prior to seating of said latching projection in said detent.

25. Modular interconnection apparatus comprising:

a plurality of contacts, each of said contacts, including an active portion, a termination portion, and an intermediate portion between said active and termination portions;

a one-piece support mounting said plurality of contacts in rows, said support including a panel having a front side and a rear side, a plurality of contact passageways arranged in rows and extending through said panel, each of said passageways receiving and mounting a respective contact therein with said termination portion extending from said rear side, and a plurality of projections extending from said rear side; and at least one mating electrical connector unit mounted on at least one of said projections, said electrical connector unit including a plurality of contacts each having a mating portion adapted to engage a contact of a complementary mating electrical connector unit and a termination portion, said termination portions electrically connected to respective ones of said termination portions of said contacts of at least one of said rows, said projections aligned in at least one row with alternate ones of said projections extending further from said rear side and each of said mating electrical connector units mounted on adjacent projections so as to extend at an angle with respect to said panel.

26. Modular interconnection apparatus comprising:
a plurality of contacts, each of said contacts including an active portion, a termination portion, and an intermediate portion between said active and termination portions;
a one-piece supporting mounting said plurality of contacts in rows, said supportincluding said plurality of contacts in rows, said support including
a panel having a front side and a rear side,
a plurality of contact passageways arranged in rows and extending through said panel, each of said passageways receiving and mounting a respective contact therein with said termination portion extending from said rear side, and
a plurality of projections extending from said rear side;
at least one mating electrical connector unit mounted on at least one of said projections, said electrical connector unit including a plurality of contacts each having a mating portion adapted to engage a contact of a complementary mating electrical connector unit and a termination portion, said termination portions electrically connected to respective ones of said termination portions of said contacts of at least one of said rows, and
an L-shaped member extending first away from and then generally parallel to and spaced from said rear side of said panel to receive a mounting bar of an equipment rack.

27. Modular interconnection apparatus comprising:
a plurality of contacts, each of said contacts including an active portion, a termination portion, and an intermediate portion between said active and termination portions;
a one-piece support mounting said plurality of contacts in rows, said support including
a panel having a front side and a rear side,
a plurality of contact passageways arranged in rows and extending through said panel, each of said passageways receiving and mounting a respective contact therein with said termination portion extending from said rear side, and
a plurality of projections extending from said rear side;
at least one mating electrical connector unit mounted on at least one of said projections, said electrical connector unit including a plurality of contacts each having a mating portion adapted to engage a contact of a complementary mating electrical connector unit and a termination portion, said termination portions electrically connected to respective ones of said termination portions of said contacts of at least one of said rows, and
each of said contact passageways in said panel comprising a flat wall section adjacent said front side, and each of said contacts including a flat surface on said active portion and a positioning element for engaging said passageway and urging said flat surface of said active portion against said flat wall section of said passageway.

28. Modular interconnection apparatus according to claim 27, wherein each of said active portions includes a wiping contact surface and an oblique end surface extending to said wiping contact surface.

29. Modular interconnection apparatus comprising:
a plurality of contacts, each of said contacts including an active portion, a termination portion, and an intermediate portion between said active and termination portions;
a one-piece support mounting said plurality of contacts in rows, said support including
a panel having a front side and a rear side,
a plurality of contact passageways arranged in rows and extending through said panel, each of said passageways receiving and mounting a respective contact therein with said termination portion extending from said rear side, and
a plurality of projections extending from said rear side; and
at least one mating electrical connector unit mounted on at least one of said projections, said electrical connector unit including a plurality of contacts each having a mating portion adapted to engage a contact of a complementary mating electrical connector unit and a termination portion, said termination portions electrically connected to respective ones of said termination portions of said contacts of at least one of said rows,
each of said panel-mounted contacts comprising
first means engaging said passageway to resist movement in the forward direction, and
second means engaging said passageway to resist movement in the rearward direction,
each of said termination portions of said panel-mounted contacts including a post to receive a wire wrapped thereabout.

30. Modular interconnection apparatus comprising:
a plurality of contacts, each of said contacts including an active portion, a termination portion, and an intermediate portion between said active and termination portions;
a one-piece support mounting said plurality of contacts in rows, said support including
a panel having a front side and a rear side,
a plurality of contact passsageways arranged in rows and extending through said panel, each of said passageways receiving and mounting a respective contact therein with said termination portion extending from said rear side, and
a plurality of projections extending from said rear side; and
at least one mating electrical connector unit mounted on at least one of said projections, said electrical connector unit including a plurality of contacts each having a mating portion adapted to engage a contact of a complementary mating electrical connector unit and a termination portion, said termination portions electrically connected to respective ones of said termination portions of said contacts of at least one of said rows,
each of said panel-mounted contacts comprising
first means engaging said passageway to resist movement in the forward direction, and
second means engaging said passageway to resist movement in the rearward direction, each of said termination portions of said panel-mounted contacts including a pair of spaced insulation-piercing fingers for receiving a conductor therebetween.

31. Modular interconnection apparatus according to claim 30, wherein each of said fingers includes a rearwardly extending projection spaced from the like projection of the other finger to grippingly receive an insulated conductor therebetween.

* * * * *